March 25, 1947.    G. F. HODSON ET AL    2,417,823
EGG FEEDING DEVICE
Filed Oct. 28, 1944    3 Sheets-Sheet 1
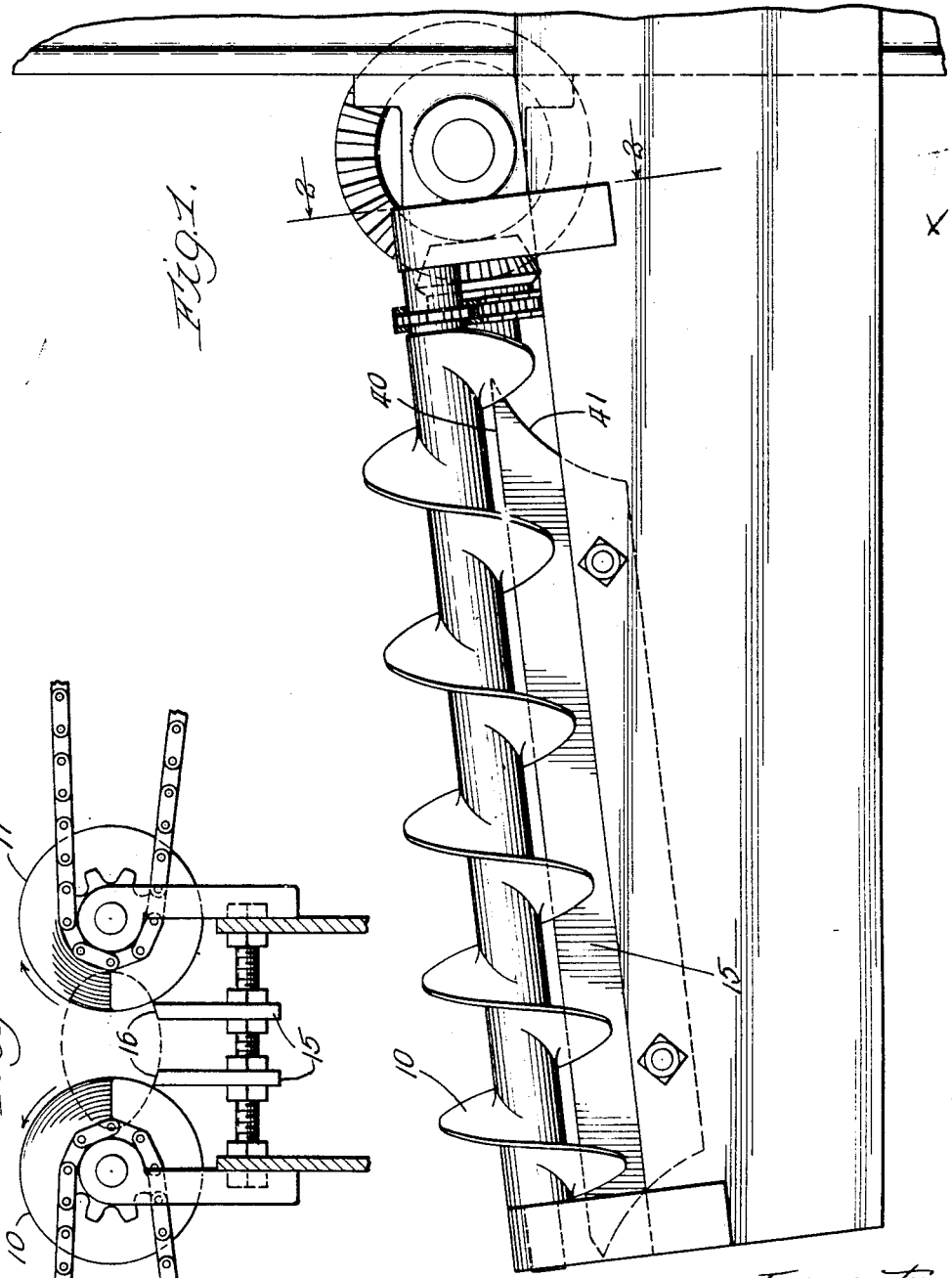

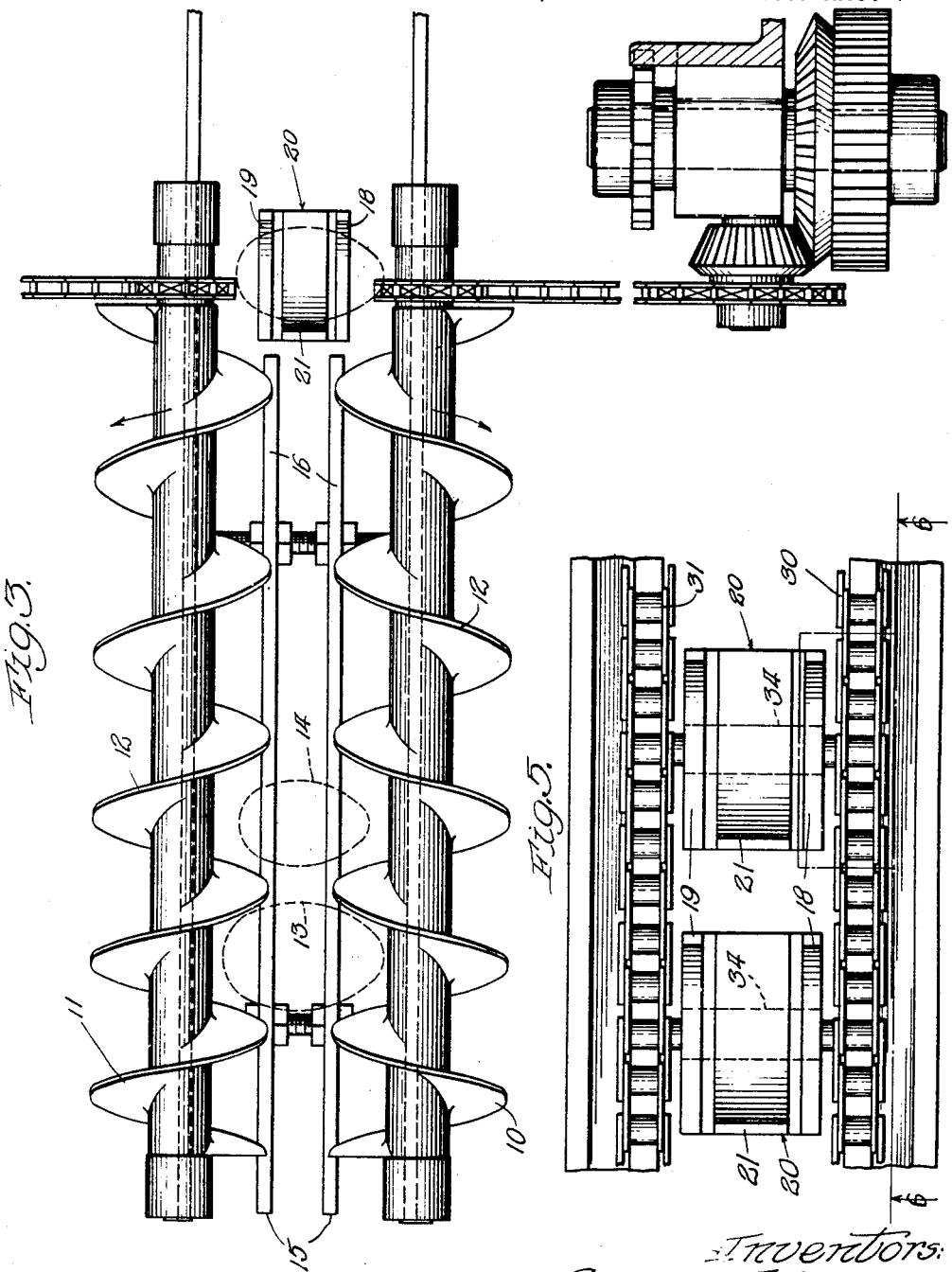

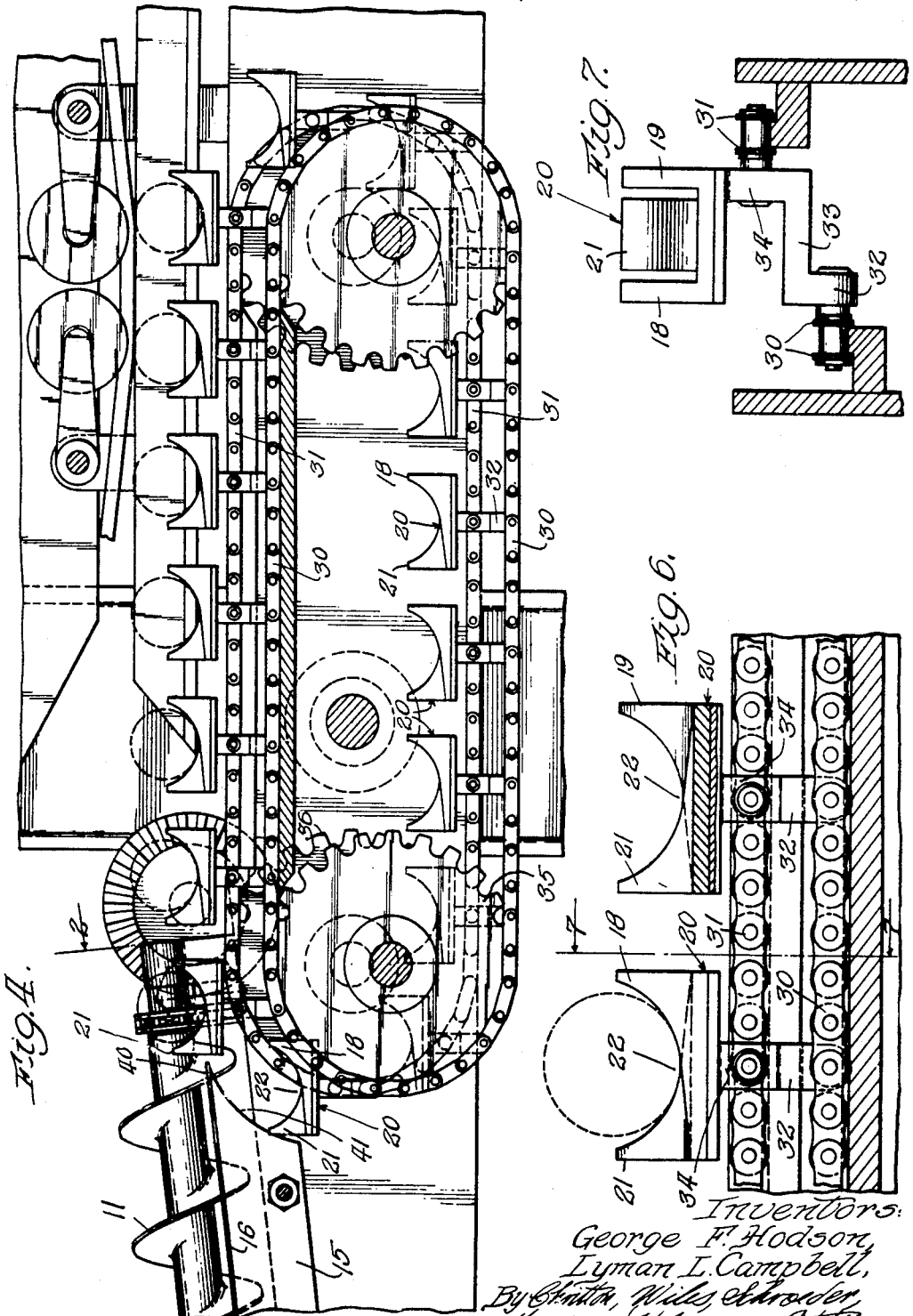

Patented Mar. 25, 1947

2,417,823

UNITED STATES PATENT OFFICE 2,417,823

EGG FEEDING DEVICE

George F. Hodson, Altus, Okla., and Lyman L. Campbell, Riverdale, Ill., assignors to Wilson & Company, Inc., a corporation of Delaware Application October 28, 1944, Serial No. 560,778

3 Claims. (Cl. 198—20)

This invention relates to an egg feeding device and more particularly to dual screw means for supplying eggs to an egg breaking process, for example, as set forth in the co-pending application of George F. Hodson, Serial No. 534,552, filed May 8, 1944.

The invention is illustrated in the drawings, in which Fig. 1 is a side elevation of the egg feeding device; Fig. 2 is a sectional view on line 2—2 of Fig. 1; Fig. 3 is a plan view; Fig. 4 is a side elevation partly in section illustrating the saddle mechanism; Fig. 5 is an enlarged plan view of a detail thereof; Fig. 6 is a sectional view on line 6—6 of Fig. 5; and Fig. 7 is a cross-sectional view on line 7—7 of Fig. 6.

The device comprises a pair of longitudinally disposed parallel screws 10 and 11 which rotate in opposite directions, as indicated by the arrows in Figs. 2 and 3. The screws are provided with wide threads 12, the pitch of which gradually increases toward the delivery end of the device so that the eggs are accelerated as they move through it. In this way they may be started at substantially zero speed and increased to whatever speed is desired, thus increasing the distance between the eggs at the delivery end of the device.

The screws are spaced from each other enough so that the largest egg 13 can be advanced transversely to its long axis between the screws, and the shortest egg 14 will be caught by the peripheries of the two threads.

The eggs are supported upon the parallel hard rubber tracks 15, the upper edges 16 of which are beveled inwardly to conform generally to the shape of the normal egg. The space between the tracks is open and usually the open distance is about ¾ inch. The tracks are upwardly inclined, as shown in Fig. 1, which maintains positive rolling engagement with the upwardly advancing edges of the screw. The egg is thus rolled up the incline while pressing back against the screw threads. There is no tendency for it to accelerate under gravity or other influences, and acquire a momentum which might cause it to be broken. The eggs are removed individually by a saddle 20 which comprises fingers 18 and 19 and the thumb 21. These are shaped to provide an egg-receiving zone 22 within which the egg is held with its long axis transverse to its direction of motion.

The saddles are carried on chains 30 and 31 in such manner that they are always vertical. The chain 30 is secured to the lower leg 32 of the saddle. This leg is connected by the transverse bar 33 to the upper leg 34 which is secured to the chain 31. In this way the two chains are carried on opposite sides of the saddle. The chains are driven by the sprocket wheels 35 and 36. They are of equal length so that once the saddles are attached in vertical position to the chains, they remain in vertical position at all points thereon.

In operation an egg is fed to the lower end of the screws 10 and 11 and advanced therethrough on the tracks 15 until it reaches the delivery end 40 of the tracks, as shown in Fig. 4. Just before it reaches this point, the saddle 20 has risen below the tracks with the thumb 21 between them and in back of the egg. In this way the egg is lifted from the track without jolt. It will be noted that the front end 41 of the track is cut away on substantially a circular segment to provide room for the fingers 18 and 19 of the saddle to get into position. The eggs are then advanced in the saddles for breaking, as indicated in the above mentioned Hodson application.

The foregoing detailed description has been given for clearness of understanding only, and no unnecessary limitations should be understood therefrom.

What we claim as new, and desire to secure by Letters Patent, is:

1. Means for delivering eggs, including a pair of spaced parallel, wide-threaded, oppositely rotating screws and means for rolling eggs between said screws comprising a longitudinal track between said screws, said track being split into two substantially parallel rail sections on which the eggs roll, to provide means for orienting the egg with its long axis transverse to the direction of its forward movement, each section being beveled inwardly to conform generally to the shape of the normal egg.

2. Means for delivering eggs, comprising a pair of spaced parallel, wide-threaded screws, a longitudinal track between said screws on which the eggs roll, said tracks being of sufficient width to steady the eggs during said rolling, and said track being provided with an opening of substantial width at the delivery end thereof, means for rotating the screws in opposite directions, and egg removing means moved synchronously with said screws and provided with an element which extends through said opening as the egg is delivered thereto.

3. An egg feeding device comprising a pair of spaced, substantially parallel, wide-threaded screws, means for rotating the screws in opposite directions, the screws being disposed with reference to each other to accommodate and feed a normal egg, an egg track longitudinally disposed between the screws and comprising at least two laterally spaced egg supporting members, there being an opening between the tracks at least at the delivery end of the screws, a saddle having a member comprising a thumb and two fingers adapted to enter said opening, and means for moving said saddle upwardly from a position below the track to an egg-receiving position adjacent thereto with its thumb disposed between the elements of the tracks, said last mentioned means being synchronized with said screw rotating means so that the saddle is moved to egg receiving position each time an egg is moved to the delivery end of the screws.

GEORGE F. HODSON.
LYMAN L. CAMPBELL.

REFERENCES CITED

The following references are of record in the file of this patent:

UNITED STATES PATENTS

| Number | Name | Date |
|---|---|---|
| 1,964,152 | Hansen | June 26, 1934 |
| 1,604,133 | Rebechini | Oct. 26, 1926 |
| 1,350,794 | Eby et al. | Aug. 24, 1920 |
| 1,113,932 | Compton | Oct. 13, 1904 |
| 1,440,744 | Phillippe | Jan. 2, 1923 |
| 1,892,670 | Jaeger | Jan. 3, 1933 |
| 1,565,849 | Druand | Dec. 15, 1925 |
| 2,377,431 | Lakso | June 5, 1945 |
| 287,010 | Desgoffe et al. | Oct. 23, 1883 |
| 1,423,698 | Thurston | July 25, 1922 |